Dec. 10, 1968   J. A. McDERMOTT   3,415,967
VIBRATION RESISTANT SWITCH MEANS FOR BATTERY CONTAINER
Filed Oct. 24, 1965   2 Sheets-Sheet 1
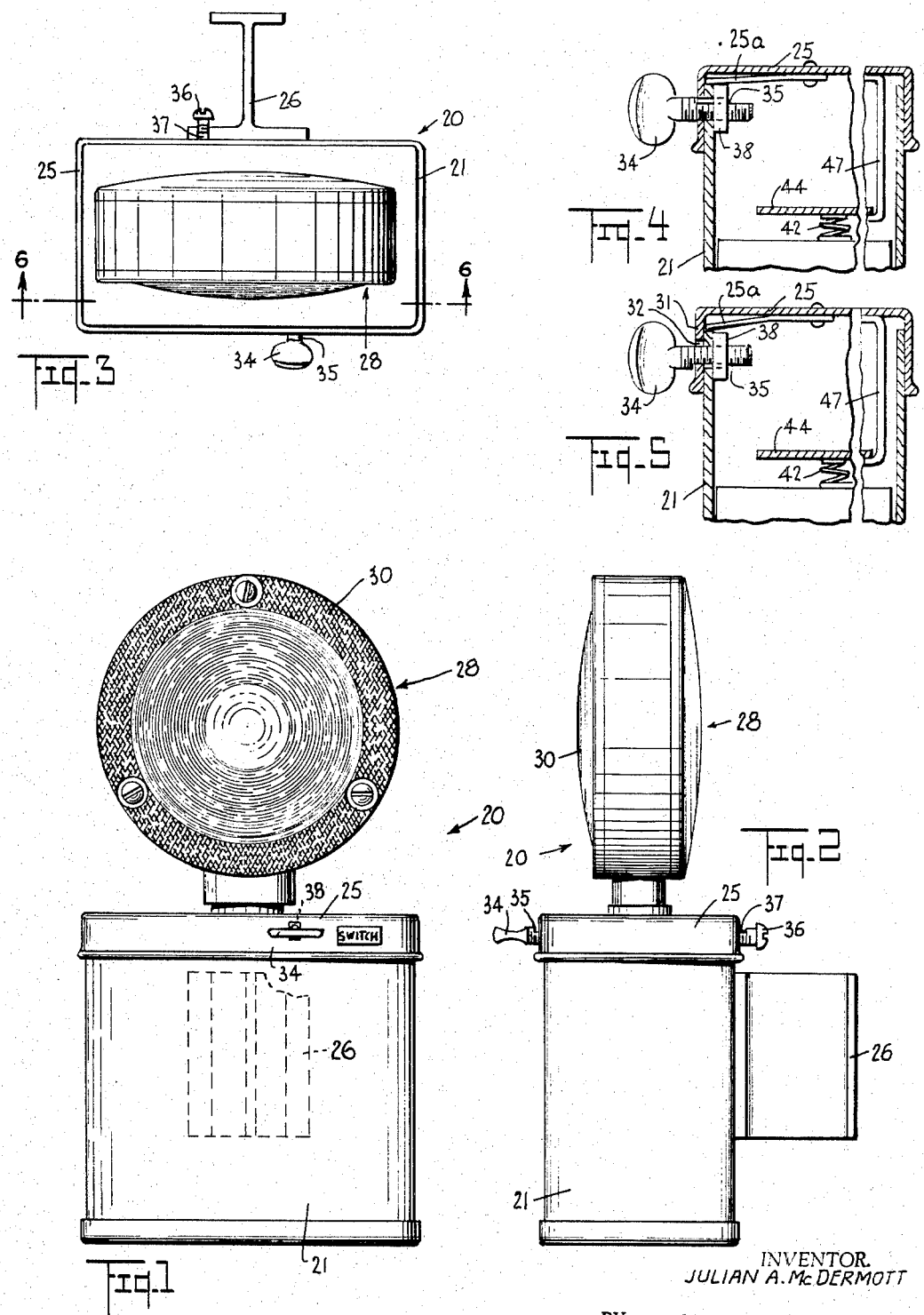

Dec. 10, 1968   J. A. McDERMOTT   3,415,967
VIBRATION RESISTANT SWITCH MEANS FOR BATTERY CONTAINER
Filed Oct. 24, 1965   2 Sheets-Sheet 2
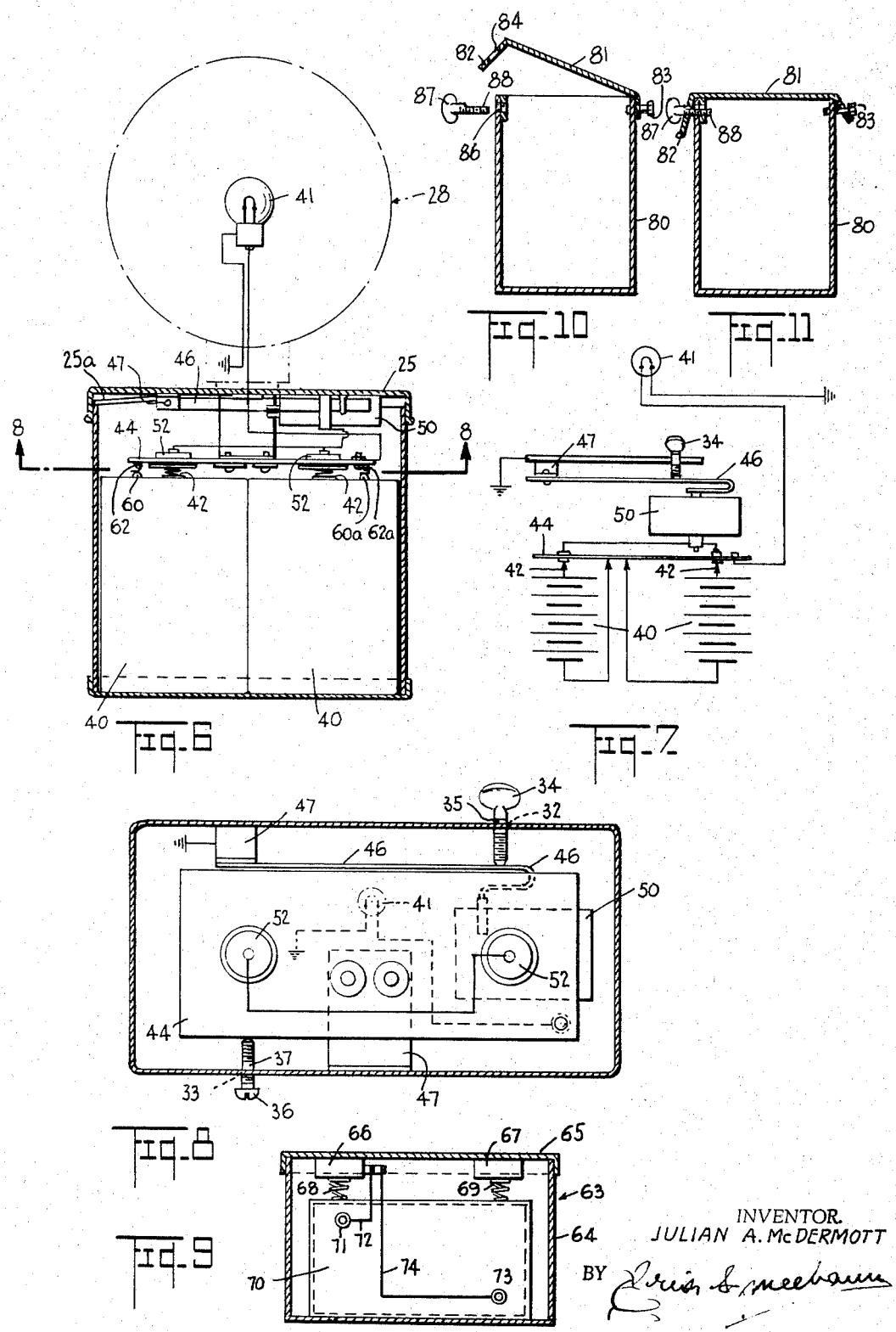
INVENTOR.
JULIAN A. McDERMOTT
BY
ATTORNEY.

United States Patent Office 3,415,967
Patented Dec. 10, 1968

3,415,967
VIBRATION RESISTANT SWITCH MEANS FOR BATTERY CONTAINER
Julian A. McDermott, 1639 Stephen St., Brooklyn, N.Y. 11227
Filed Oct. 24, 1965, Ser. No. 504,936
7 Claims. (Cl. 200—158)

ABSTRACT OF THE DISCLOSURE

The present invention has reference to a battery container which is so constructed that it will not become inoperative due to vibration.

This invention relates boardly to battery containers for emergency lamps, and it has more specific reference to the provision of a vibration resistant battery container.

Battery operated warning lamps are frequently positioned at the rear of moving railroad trains to call attention to the presence of the train on the track. Conventionally, pressure of the battery container cover against the batteries in the container causes the lamp to remain activated. The difficulty of such an arrangement lies in the fact that a moving railroad train produces extensive and constant vibration. This can and frequently does cause the battery cover to become loosened, causing the lamp to fail at a time and place where such failure is not readily noticed by train personnel.

With this in view, it is the principal object of the present invention to provide a battery container, the relative relationshp of the cover to the body of the contaner being such, that the cover cannot become loose nor the switch turn itself off due to vibration.

And a further aim of the present invention lies in the provision of a vibration resistant battery container including a removable cover and means cooperating between the cover and the body of the container, whereby the effect of vibration on the container will not cause the lamp to fail nor the switch to switch itself off.

These and other meritorious aims and advantages which will become more fully apparent as the description hereof proceeds, are attained by the novel combination of parts, hereinafter described, and illustrated on the accompanying drawings, constituting a material component of the present disclosure, and in which:

FIGURE 1 is a front elevational view of a warning lamp mounted upon a vibration resistant container of the present invention.

FIGURE 2 is a side elevational view of the unit illustrated in FIGURE 1.

FIGURE 3 is a top plan view of the device illustrated in FIGURE 1.

FIGURE 4 is a fragmentary sectional view of the battery container, showing the cover locking means before the container has been exposed to vibration.

FIGURE 5 is a view similar to FIGURE 4, but showing the cover locking means after the cover has been exposed to vibration.

FIGURE 6 is a sectional view of the unit, the section taken on line 6—6 of FIGURE 3.

FIGURE 7 is a diagrammatic view of one method of wiring the lamp illustrated in FIGURE 1.

FIGURE 8 is a sectional view of the device, the section taken on line 8—8 of FIGURE 6.

FIGURE 9 is a sectional view of a modified vibration resistant battery container.

FIGURE 10 is a longitudinal sectional view of container in open position.

FIGURE 11 is a view similar to FIGURE 10, but showing the container in closed position.

Referring in greater detail of the drawings, the numeral 20 refers broadly to a lighting unit such as is illustrated throughout the drawings. Lighting unit 20 comprises broadly a lamp 28 which is not a part of the present invention but is illustrated and described merely for clarity. The invention comprises a container 21 for a pair of dry cell batteries 40, the said container 21 being substantially a hollow cylindrical rectangular box. Container 21 is provided with a removable cover 25. Cover 25 has a flange 31 throughout its edge to engage the container 21 near its upper end. Flange 31 has an opening 32 therein, the said opening, when the cover is placed upon the container, in alignment with a similar opening 33 in the wall of the battery container 21.

The invention further comprises a screw 34, here illustrated as being a wing screw. The stem of screw 34 is adapted to pass through the aligned openings 32 and 33 when the container 21 is closed. The stem of screw 34 is provided with a flattened portion 35 for a purpose which will presently become more fully apparent.

Diametrically opposite openings 32 and 33 in the flange and container wall respectively are a pair of aligned openings in the flange and container wall for the passage therethrough of a screw 36 having a flattened portion 37. Nuts 38 is provided for each of the screws 34 and 38, the said nuts 38 being positioned inside the container 21.

A pair of conventional batteries 40 are positioned in the battery container 21 to activate the lamps 41 behind the lens 30. The said batteries 40 are provided with terminals 42, here illustrated as being spring terminals. Each of the said spring terminals 42 is retained by a plate 44.

Spring contact 46 maintained on cover 25 has for its function to serve as a switch leaf operated by the pressure of screw 34 thus completing contact with the electric contact box of flasher 50.

Referring again to the openings 31 and 21 on the cover flange, the said openings may either be rectangular or provided with a flat bottom.

The modification of the invention illustrated in FIGURE 9 differs from the principal embodiment in that different types of batteries without contact springs are used. In this modification, the battery container, broadly referred to by the numeral 63, comprises a hollow rectangular cylindrical body portion 64 having a cover 65, the circumferential flange of which is adapted to engage the open end of body portion 64. On its innerface, the said cover 65 is spacedly provided with spacers 66 and 67 which serve as spacers. Body portion 64 contains a battery 70 which is provided with a pair of terminals 71 and 73 respectively. Each of the said terminals has connections numbered 72 and 74 respectively. The spacer blocks have springs numbered 68 and 69, the said springs being spaced from each other, and press against the battery 70.

In the modification illustrated in FIGURES 10 and 11, a hollow rectangular battery container 80 is shown in section in the drawings. In this modification, the spring effect to maintain the holding screws and switch screws respectively numbered 83 and 87 in tension and in operation is achieved by bending the flange 82 of cover 81 outwardly so that individually they will produce a lifting effect. The battery container 80 has a fastening nut 86. Screw 87 is provided with a flattened portion 88, and at 84 the opening in cover flange 82 for screw 87 is illustrated in the drawing. A rivet or screw 83 may be provided to retain the cover in permanent engagement on the container.

The vibration resistant battery container of the present invention is used in the following manner:

When the battery container illustrated in FIGURE 1 is used, the cover is removed and a pair of conventional dry cell batteries are placed inside the battery container. When the cover is secured upon the battery container, the batteries will remain in operative position as long as elements 42 and 52 and elements 44 and 60 remain in contact. Continuous and excessive vibration, such as is produced by a moving train, will cause screw 34 to turn until eventually the cover 25 is loosened and becomes disengaged from the battery container. However, the present invention prevents this occurrance, by providing the screw 34 with a flattened surface 35 and by providing a square opening in the wall of the battery container cover into which the said screw 34 is entered. These squared areas limit the turning of the holding screw due to vibration.

When the screw 34 passes through the cover flange and the wall of the battery container, it engages a spring leaf 46. Movement of this spring leaf completes the electrical circuit, illuminating the bulb. By preventing the turning of the screw due to vibration as heretofore explained, the switch becomes immune to the effect of vibration and cannot turn itself off.

In FIG. 4, 25a represents a spring used to maintain tension between the cover and the body when required.

The numeral 25a relates to a leaf spring which might be added to achieve further tension.

The modification illustrated in FIGURE 9 is used when a battery container for a single dry cell battery, or batteries without spring contacts are utilized. Contacts 68 and 69 make contact with the battery container to maintain tension.

In the modification illustrated in FIGURES 10 and 11, the cover flange is bent outwardly slightly, whereby the required amount of tension can be maintained on screw 87 when screw 83 is in place. This modification is desirable when no other means for keeping tension on screw 87, which can also serve as a switch, is provided.

Thus there has been shown and described a battery container which is vibration resistant in the principal form of its embodiment and in several modifications thereof. Other modifications will become apparent through use.

It is to be understood that the foregoing is to be regarded as illustrative and descriptive only of the best known forms of the present invention and not as limitative or restrictive to the exact details shown, applicant reserving the right to make such changes in the construction of his device as might come within the scope of the appended claims, without thereby departing either from the spirit or the scope of the present invention.

Having thus described the invention, what is claimed as new and desired to secure by Letters Patent is:

1. In a container for electrical batteries including a box body with an open end, a removable cover, said cover having a flanged edge to fit over the open end of said box body, an opening through said flange and said box body, one of said openings having a flattened portion, screw means removably retaining said cover on said box body, said screw means having a portion flattened and said screw means adapted to engage the flattened part of an opening through which said screw means projects through said flange and said box body.

2. In a container for electric batteries including a box body having an open end, a cover, said cover having a flanged edge adapted to fit over said open end of said box body, an opening in said flange, said opening having a flattened portion, an opening in said box body in alignment with said flange opening, screw means removably retaining said cover on said box body, said screw means having a portion flattened and said screw means adapted to engage the flattened portion of the opening in said cover flange through which said screw means projects.

3. In a container for electric batteries as set forth in claim 1 wherein said screw means is adapted to engage a flattened element of said container.

4. A container for electric batteries including a box body having an open end, a cover, said cover having a flanged edge to fit over said open end of said box body, screw means removably retaining said cover on said box body, an opening in said box body, an opening in said flange in alignment with said first named opening, one of said openings having a flattened portion, spring means exerting pressure to urge said cover from said box body, said screw means having a flattened portion, said screw means engaging the flattened part of the opening through which said screw means projects through said flange and said box body, and said spring action against said cover provided by said springs mounted on the batteries in said container.

5. In a container as set forth in claim 4, wherein said screw means serves as the operating element of an on-off switch.

6. In a container for electric batteries including a box body having an open end, a cover, said cover having a flanged edge fitting over the open end of said box body, an opening in said box body, an opening in said flanged edge in alignment with said opening in said box body, one of said openings having a flattened portion, screw means removably retaining said cover on said box body, said screw means having a flattened portion adapted to engage the flattened opening through which said screw means projects through said flange and said body portion, spring means urging said cover from said box body, said spring means mounted on the batteries in said container, and said screw means adapted to serve as the operating element of an on-off switch.

7. In a container for electric batteries including a box body having an open end, a cover, said cover having a flanged edge adapted to fit over said open end of said box body, an opening in said flanged edge, said opening having a flattened portion, an opening in said box body in alignment with said first named opening, screw means removably retaining said cover on said box body, said screw means having a flattened portion, said screw means engaging the flattened portion of said opening in said cover flange through which said screw means projects, and said screw means serving as the operating element of an on-off switch.

References Cited

UNITED STATES PATENTS

| 1,146,628 | 7/1915 | Koretzky | 240—10.65 |
| 2,608,639 | 8/1952 | Packer et al. | 240—10.63 |
| 614,318 | 11/1898 | Bugg | 200—158 |
| 990,681 | 4/1911 | Strepey | 151—68 |

ROBERT K. SCHAEFER, Primary Examiner.

H. BURKS, Assistant Examiner.

U.S. Cl. X.R.

151—68